(12) United States Patent
Maeda

(10) Patent No.: US 10,309,798 B2
(45) Date of Patent: Jun. 4, 2019

(54) NAVIGATION SYSTEM, AEROSPACE VEHICLE AND OPTICAL MARKER

(71) Applicant: Astroscale Japan Inc., Tokyo (JP)

(72) Inventor: Ken Maeda, Tokyo (JP)

(73) Assignee: ASTROSCALE JAPAN INC., Tokyo (JP)

( * ) Notice: Subject to any disclaimer, the term of this patent is extended or adjusted under 35 U.S.C. 154(b) by 31 days.

(21) Appl. No.: 15/627,284

(22) Filed: Jun. 19, 2017

(65) Prior Publication Data

US 2018/0335314 A1    Nov. 22, 2018

(30) Foreign Application Priority Data

May 19, 2017   (JP) .................................. 2017-100022

(51) Int. Cl.

| | |
|---|---|
| *B64G 1/58* | (2006.01) |
| *B64G 1/64* | (2006.01) |
| *B64G 3/00* | (2006.01) |
| *G01S 5/16* | (2006.01) |
| *G06T 7/70* | (2017.01) |
| *G01B 11/26* | (2006.01) |
| *G01B 11/27* | (2006.01) |
| *G01C 23/00* | (2006.01) |

(52) U.S. Cl.
CPC ............... *G01C 23/00* (2013.01); *B64G 1/58* (2013.01); *B64G 1/646* (2013.01); *B64G 3/00* (2013.01); *G01B 11/26* (2013.01); *G01B 11/272* (2013.01); *G01S 5/163* (2013.01); *G06T 7/70* (2017.01); *G06T 2207/30204* (2013.01)

(58) Field of Classification Search
CPC . G01C 23/00; G06T 7/70; G06T 2207/30204; B64G 1/58; B64G 3/00
See application file for complete search history.

(56) References Cited

U.S. PATENT DOCUMENTS

| | | | | |
|---|---|---|---|---|
| 4,260,160 A | * | 4/1981 | Ejnell | ........................ F41J 2/02 250/503.1 |
| 6,288,845 B1 | * | 9/2001 | Harada | .................. G02B 7/023 359/642 |
| 2004/0149860 A1 | | 8/2004 | LeCroy, Jr. | |

FOREIGN PATENT DOCUMENTS

| | | |
|---|---|---|
| JP | H06-072399 A | 3/1994 |
| JP | H08-244699 A | 9/1996 |

OTHER PUBLICATIONS

R. W. Dissly et al., "Flash Lidars for Planetary Missions," International Workshop on Instrumentation for Planetary Missions, 2012, pp. 1-5.

(Continued)

*Primary Examiner* — Michael E Teitelbaum

(57) ABSTRACT

Simplify, downsize and reduce power of devices which comprise the satellite navigation system used in approach and docking in space. The navigation system 1 which estimates an attitude of a target object T in space comprises: an optical marker 10 that is attached to the target T and reflects light; a lighting device 20 that irradiates the target object T with light of a predetermined wavelength band; an image acquisition device 30 that acquires an image of the optical marker 10 which has reflected the light of the predetermined wavelength band; and an image processing device 40 that processes the image acquired by the image acquisition device 30 and thereby estimates the attitude of the target object T. The lighting device 20 and the image processing device 30 are loaded on an aerospace vehicle 2.

9 Claims, 2 Drawing Sheets

(56) References Cited

OTHER PUBLICATIONS

M. Aviles et al., "A Complete IP-based Navigation Solution for the Approach and Capture of Active Debris," 67th International Astronautical Congress (IAC), Sep. 26-30, 2016, pp. 1-8, International Astronautical Federation (IAF).

Richard T. Howard et al., "Proximity Operations and Docking Sensor Development", 2009 IEEE Aerospace Conference, Mar. 7, 2009, pp. 1-8, Piscataway, NJ, USA, IEEE.

Richard T. Howard et al., "An Advanced Sensor for Automated Docking", 20th DASC. 20th Digital Avionics Systems Conference, Oct. 14, 2001, pp. 8.B.6-1-8.B.6-7, vol. 2, Piscataway, NJ, USA, IEEE.

Jennifer D. Mitchell et al., "Automated Rendezvous and Docking Sensor Testing at the Flight Robotics Laboratory", 2007 IEEE Aerospace Conference, Mar. 3, 2007, pp. 1-16, Piscataway, NJ, USA ,IEEE.

Extended European Search Report for EP Application No. 17179136.1, dated Mar. 16, 2018.

\* cited by examiner

NAVIGATION SYSTEM, AEROSPACE VEHICLE AND OPTICAL MARKER

BACKGROUND

Field

The present application is based on Japanese Application No. (Patent Application) 2017-100022 filed on May 19, 2017 and contents described therein are adopted here.

Description of Related Art

The present invention relates to a navigation system, an aerospace vehicle and an optical marker.

There are satellites on the earth orbit which approach and dock to other satellites for supply, equipment repair, retrieval associated with mission completion and so forth. In recent years, various techniques of estimating a position and an attitude (perspective and rotating state) of a target satellite for approach and docking have been proposed for safe and efficient approach and docking.

For example, in Non-Patent Document 1 proposes a technique to estimate the attitude of the target object by an arithmetic operation device based on the light from a Flash Lidar. More specifically, irradiating a target object with laser light from a Flash Lidar, detecting light reflected out of the target object by a two-dimensional array type photodetector, and then outputting an image of the target object and estimating the attitude of the target object. Also to increase the accuracy of attitude estimation, advanced image processing technique without utilizing the Flash Lidar are proposed in Non-Patent Document 2.

CITATION LIST

Patent Documents

[Non-Patent Document 1]: R. W. Dissly and five others, FLASH LIDARS FOR PLANETARY MISSIONS, International Workshop on Instrumental for Planetary Missions (2012), 2012, Internet <URL: http://www.lpi.usra.edu/meetings/ipm2012/pdf/1145.pdf.

[Non-Patent Document 2]: M. Aviles, and three others, A Complete IP-based Navigation Solution for the Approach and Capture of Active Debris, 67th International Astronautical Congress (IAC), September 2016, Internet<URL: http://iafastro.directory/iac/archive/tree/IAC-16/A6/6/IAC-16,A6,6,5,x33749.brief.pdf>.

SUMMARY

However, the technique described in the Non-Patent Document 1 has several issues. To irradiate the target object with the laser light, it consumes large electric power. Also the outputted image data is two-dimensional therefore the data volume is large and a special processing system such as an FPGA is required. The technique described in the Non-Patent Document 2 also has an issue of highly complicated and precise image processing. For approach processing, it required a human to extract characteristic points of the target object and make a model. This requires a large effort for designing a navigation system. When adopting such existing navigation techniques, device becomes more complicated and larger, and power consumption increases. As a result, development and manufacturing costs could be greatly increased and it may become difficult to load the navigation system on a small-size satellite around 100 kg.

The present invention may solve the above mentioned circumstances. It aims to simplify, downsize and reduce power consumption of devices in the satellite navigation system for approach and docking in space.

The present invention is a navigation system to estimate the attitude of the target object in space that can attain the above-mentioned aim. This system comprises: an optical marker that is attached to the target object and reflects light; a lighting device that irradiates the target object with light of a predetermined wavelength band; an image acquisition device that acquires an image of the optical marker which has reflected the light of the predetermined wavelength band; and an image processing device that processes the image acquired by the image acquisition device and thereby estimates the attitude of the target object, wherein the lighting device and the image acquisition device are loaded on an aerospace vehicle.

In addition, an aerospace vehicle according to the present invention can estimate the attitude of the target object and comprises: a lighting device that irradiates an optical marker which is attached to a target object in space and reflects light with light of a predetermined wavelength band; and an image acquisition device that acquires an image of the optical marker which has reflected the light of the predetermined wavelength band, wherein the image acquired by the image acquisition device is processed by an image processing device.

Further, an optical marker according to the present invention is attached to a target object in space before the target object is launched into space. The optical marker reflects light of a predetermined wavelength band radiated from a lighting device of an aerospace vehicle; an image of the optical marker which has reflected the light of the predetermined wavelength band is acquired by an image acquisition device of an aerospace vehicle; and the image is processed by an image processing device. As a result, an aerospace vehicle can estimate the attitude of the target object.

It becomes possible to estimate of the attitude of the target object by adopting such configurations. The light of the predetermined wavelength band which has been radiated from the lighting device of the aerospace vehicle is made to reflect out of the optical marker which is attached to the target object in space, the image of the optical marker which has reflected the light of the predetermined wavelength band is acquired by the image acquisition device of the aerospace vehicle, the acquired image is processed by the image processing device and enable the estimation of the attitude. In a case where the target object is, for example, a satellite, it is supposed that the surface of the satellite is coated with a heat insulation film which absorb the light of the predetermined wavelength band (for example, near-ultraviolet range light having a wavelength band of 300 nm to 400 nm). When the optical marker is attached to the target object having the surface which would absorb the light of the predetermined wavelength band, it is easy to acquire the image of the optical marker which reflects the light of the predetermined wavelength band by the image acquisition device and image processing is also facilitated. Accordingly, it is possible to simplify and downsize the configuration of the image acquisition device and to reduce the electric power consumption of the image processing device. Consequently, it is possible to reduce the development and manufacturing costs of the navigation system and to downsize the aerospace vehicle which loads the image acquisition device thereon. The image processing device may be either loaded on the aerospace vehicle or allocated on a ground station.

In the navigation system in accordance with the present invention, the lighting device that includes a light emitting diode may be adopted.

By adopting such a configuration, it is possible to configure the comparatively power saving lighting device and to irradiate the optical marker with comparatively long range light.

In the navigation system in accordance with the present invention, the optical marker that includes a retroreflective material may be adopted.

By adopting such a configuration, it becomes possible to match the direction of the incoming and outgoing light of the optical marker. This enables the acquisition of the optical marker image regardless of the attitude of the target object.

In the navigation system in accordance with the present invention, multiple optical markers may be attached to a predetermined surface of the target object and the optical markers may be positioned rotationally asymmetrically with respect to a virtual axis which is vertical to the predetermined surface.

By adopting such a configuration, it becomes possible to easily estimate rotating states of the optical markers (eventually, a rotating state of the target object).

In the navigation system in accordance with the present invention, the image acquisition device that includes an optical lens and an imaging sensor may be adopted. In such a case, the optical lens may have an optical filter which transmits the light with the predetermined wavelength band.

By adopting such a configuration, it is possible to prevent the imaging sensor to acquire an image of light other than the light with the predetermined wavelength band (for example, the near-ultraviolet range light having the wavelength band of 300 nm to 400 nm). Accordingly, it is possible to easily identify the images of the optical markers.

The present invention simplifies, downsizes and reduces power consumption of the devices which configure the satellite navigation system for approach and docking in space.

DETAILED DESCRIPTION

Hereinafter, an embodiment of the present disclosure is described with reference to the drawings.

Figure 1:
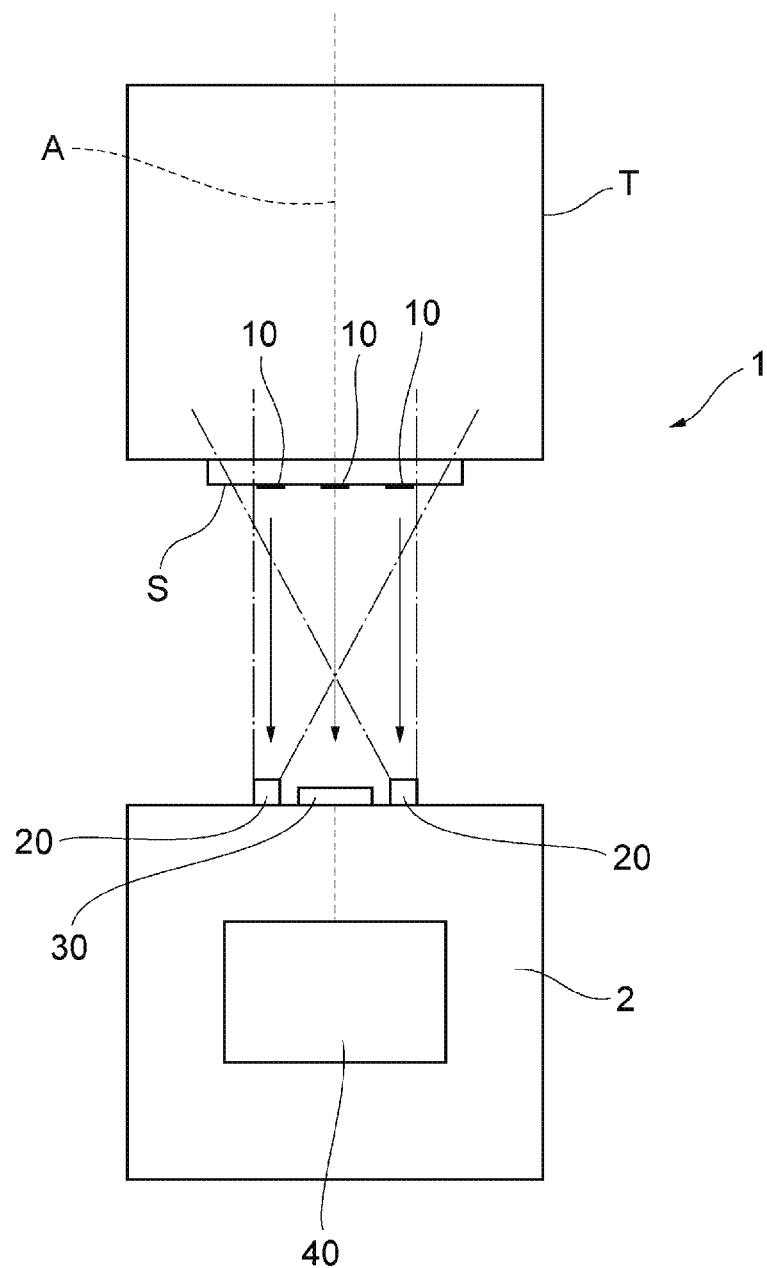
FIG. 1 is a configuration diagram illustrating one example of a configuration of a navigation system according to one embodiment of the present invention.

At first, the configuration of a navigation system 1 according to one embodiment of the present invention will be described. The navigation system 1 according to one embodiment of the present invention is adapted to estimate the attitude of a target object (such as a satellite) T in space and includes an optical marker 10, a lighting device 20, an image acquisition device 30 and an image processing device 40 as illustrated in FIG. 1. The lighting device 20, the image acquisition device 30 and the image processing device 40 are loaded on an aerospace vehicle (a chaser satellite which approaches the target object T) 2. The aerospace vehicle 2 is configured to be separated from a rocket so as to be autonomously maneuverable in space after having been attached to the rocket and launched into space.

Figure 2:
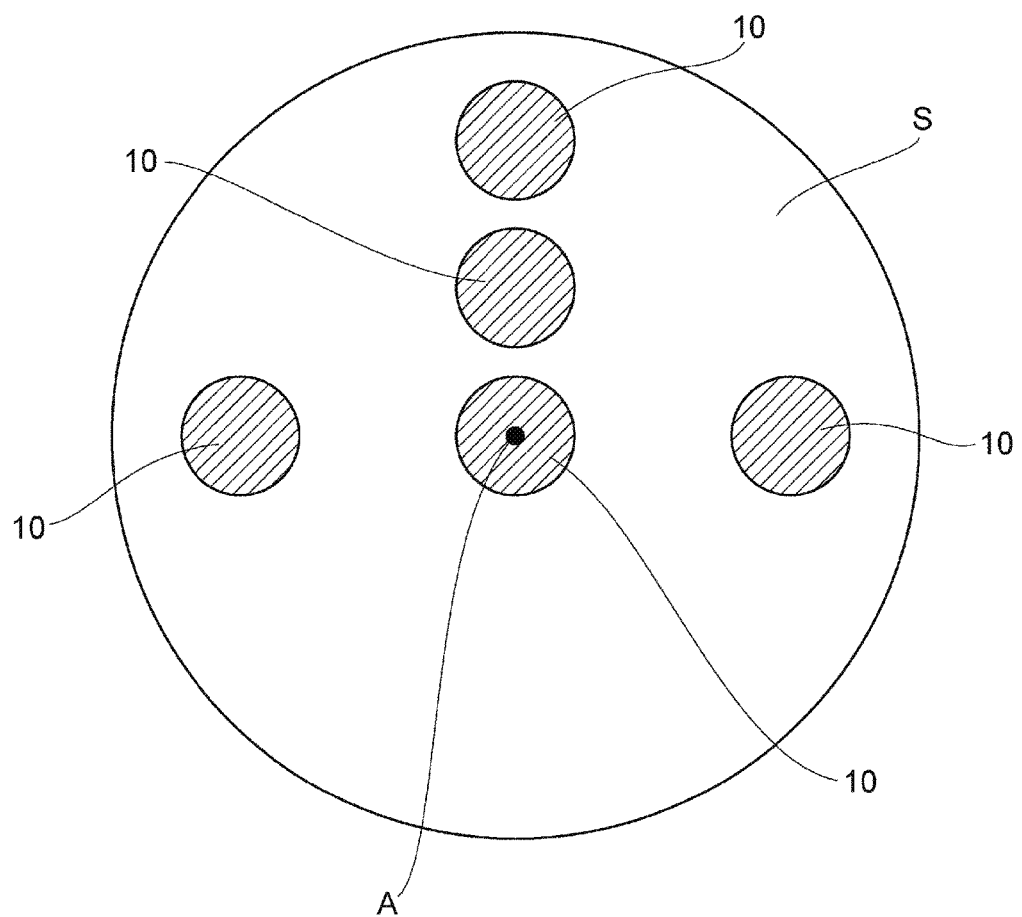
FIG. 2 is an explanatory diagram illustrating one example of arrangement of optical markers which configure the navigation system according to one embodiment of the present invention.

The optical marker 10 is attached to a predetermined surface S of the target object T as illustrated in FIG. 1 and FIG. 2 and is configured to reflect light. Although the optical marker 10 according to the present embodiment is configured to reflect at least the light of the predetermined wavelength band (for example, the near-ultraviolet range light having the wavelength band of 300 nm to 400 nm) which would be absorbed by a heat insulation film placed on the surface of the target object T, the optical marker 10 which reflects light of all wavelength bands may be adopted.

In the present embodiment, five optical markers 10 are attached to the predetermined surface S of the target object T as illustrated in FIG. 2 and the optical markers 10 are positioned rotationally asymmetrically with respect to a virtual axis A positioned at the center which is vertical to the predetermined surface S. It becomes possible to estimate the rotating state of the target object T around a predetermined rotation axis (not illustrated) by locating the optical markers 10 in this way. Meanwhile, the rotation axis of the target object T may not necessarily match the virtual axis A. Since when the target object T rotates around the rotation axis, the respective positions of multiple optical markers 10 are changed, it becomes possible to estimate the rotating state of the target object T on the basis of positional relations of the optical markers 10 before and after rotation.

In addition, in the present embodiment, the optical marker 10 which includes the retroreflective material is adopted. Accordingly, it becomes possible to match the direction of the incoming and outgoing light of the optical markers 10.

The lighting device 20 irradiates the target object T with the light of the predetermined wavelength band. The lighting device 20 according to the present embodiment includes the light emitting diode and is attached to a predetermined position of the aerospace vehicle 2 as illustrated in FIG. 1. The attachment position of each lighting device 20 and the number of the lighting devices 20 to be attached may be appropriately decided in accordance with the position of each optical marker 10 and the number of the optical markers 10 to be allocated.

The wavelength band of the light that the lighting device 20 radiates may be appropriately decided in accordance with the type, the material and so forth of the heat insulation film which is formed on the surface of the target object T. For example, it is known that a surface on which a heat insulation film made of silver-coated Teflon is formed absorbs about 95% of energy of light of a wavelength band of 305 nm to 315 nm. It is also known that a surface on which a heat insulation film made of aluminized Kapton is formed absorbs at least 85% of energy of the light of the wavelength band of 300 nm to 400 nm. Therefore, it is possible to irradiate the optical markers 10 with the light having the above-mentioned wavelength bands by the lighting device 20 and to make the light having the above-mentioned wavelength bands reflect out of the optical markers 10. The inventors of the present invention have observed the point that the heat insulation films made of the silver-coated Teflon, the aluminized Kapton, white paint and so forth absorb the near-ultraviolet range light and achieved the present invention by adopting a configuration that optical markers 10 reflect the light of such wavelength bands.

The image acquisition device 30 acquires an image of the optical marker 10 which has reflected the light of the predetermined wavelength band. In the present embodiment, the image acquisition device 30 which includes an optical lens and an imaging sensor is adopted and the optical lens is provided with an optical filter which transmits the light of the predetermined wavelength band. A wavelength band (for example, from 300 nm to 400 nm) which would be absorbed by the heat insulation film formed on the surface of the target object T may be adopted as the predetermined wavelength band. The image acquisition device 30 is attached to a predetermined position of the aerospace vehicle 2 as illustrated in FIG. 1. The attachment position of the image acquisition device 30 may be appropriately decided in accordance with the position of each optical marker 10 and the number of the optical markers 10 to be allocated.

The image processing device 40 processes the image acquired by the image acquisition device 30 and thereby estimates the attitude of the target object T. A processor which reads various programs and various pieces of data used for image processing and attitude estimation out of a memory and executes arithmetic operations relating to image processing and attitude estimation may be adopted as the image processing device 40. In the present embodiment, the image processing device 40 is loaded on the aerospace vehicle 2.

Hereinafter, a method of estimating the attitude of the target object T by the navigation system 1 according to the embodiment of the present invention will be described.

First, the aerospace vehicle 2 moves toward the target object T and faces the predetermined surface S of the target object T. Then, the light of the predetermined wavelength band is radiated from the lighting device 20 which is loaded on the aerospace vehicle 2 toward the target object T so as to make the light of the predetermined wavelength band reflect out of each optical marker 10 attached to the target object T. Then, the image of the optical marker 10 which has reflected the light of the predetermined wavelength band is acquired by the image acquisition device 30 loaded on the aerospace vehicle 2. On this occasion, only the light of the predetermined wavelength band is detected due to the optical filter provided on the optical lens of the image acquisition device 30. Then, the image which has been acquired by the image acquisition device 30 is processed by image processing device 40 loaded on the aerospace vehicle 2 and thereby the attitude of the target object T is estimated.

In the navigation system 1 according to the above-mentioned embodiment, the light of the predetermined wavelength band which is radiated from the lighting device 20 of the aerospace vehicle 2 is made to reflect out of each optical marker 10 which is attached to the target object T in space, the image of the optical marker 10 which has reflected the light of the predetermined wavelength band is acquired by the image acquisition device 30 of the aerospace vehicle 2, the acquired image is processed by the image processing device 40 and whereby estimation of the attitude of the target object T becomes possible. It is supposed that the surface of the target object T which is the target satellite is coated with the heat insulation film having the feature of absorbing the light of the predetermined wavelength band (for example, the near-ultraviolet range light having the wavelength band of 300 nm to 400 nm). When each optical marker 10 is attached to the target object T which has the surface which would absorb the light of the predetermined wavelength band in this way, it becomes possible to easily acquire the image of the optical marker 10 which reflects the light of the predetermined wavelength band by the image acquisition device 30 and processing of the image is also facilitated. Accordingly, it is possible to simplify and downsize the configuration of the image acquisition device 30 and to reduce the electric power consumption of the image processing device 30. As a result, it is possible to reduce the development and manufacturing costs of the navigation system 1 and to downsize the aerospace vehicle 2 which loads the image acquisition device 30 thereon.

In addition, in the navigation system 1 according to the above-mentioned embodiment, the lighting device 20 which includes the light emitting diode is adopted. Therefore, it is possible to configure the comparatively power saving lighting device 20 and it is possible to irradiate the optical marker 10 with light at comparatively long range.

In addition, in the navigation system 1 according to the above-mentioned embodiment, optical marker 10 which includes the retroreflective material is adopted. Therefore it becomes possible to match the direction of incoming and outgoing light of the optical marker 10. Accordingly, it enables the acquisition of the optical marker 10 image regardless the attitude of the target object T.

In addition, in the navigation system 1 according to the above-mentioned embodiment, multiple optical markers 10 are attached to the predetermined surface S of the target object T and are positioned rotationally asymmetrically with respect to the virtual axis A which is vertical to the surface S. This enables one to easily estimate the rotating states of the optical markers 10 (eventually, the rotating state of the target object T).

In addition, in the navigation system 1 according to the above-mentioned embodiment, since the image acquisition device 30 which includes the optical lens and the imaging sensor is adopted and the optical lens is provided with the optical filter which transmits the light of the predetermined wavelength band (for example, the near-ultraviolet range light having the wavelength band of 300 nm to 400 nm), it is possible to prevent an image of light other than the light of the predetermined wavelength band from being acquired by the imaging sensor. Accordingly, it is possible to easily identify the images of the optical markers 10.

Meanwhile, although in the present embodiment, one example wherein the image processing device 40 is loaded on the aerospace vehicle 2 is indicated, the image processing device 40 may be allocated on the ground station. In such a case, transmission means is provided to transmit image data acquired by the image acquisition device 30 of the aerospace vehicle 2 to image processing device 40 on the ground.

In addition, although in the present embodiment, one example that the optical markers 10 are attached to the predetermined surface S of the target object T is indicated, the surface to which the optical markers 10 are attached may not necessarily be flat and may have some unevenness. In addition, the number of the optical markers 10 is not limited to five.

In addition, although in the present embodiment, a satellite (target satellite) is exemplified as the target object T, the target object is not limited to a satellite.

The present invention is not limited to the above-mentioned embodiment and a configuration that the inventors and others have made by appropriately adding design changes to the above-mentioned embodiment is also included into the scope of the present invention as long as it has the characteristics of the present invention. That is, the respective elements that the above-mentioned embodiment includes, such as the arrangement, materials, conditions, shapes, sizes and so forth, are not limited to those which are exemplified and may be appropriately changed. In addition, the respective elements that the above-mentioned embodiment includes may be combined with one another as long as it is technically possible and combinations of the respective elements are also included into the scope of the present invention as long as they have the characteristics of the present invention.

REFERENCE SIGNS LIST

1 . . . navigation system
2 . . . aerospace vehicle
10 . . . optical marker
20 . . . lighting device
30 . . . image acquisition device
40 . . . image processing device
A . . . virtual axis
S . . . predetermined surface
T . . . target object

What is claimed is:

1. A navigation system which estimates an attitude of a target object in space comprising:
an optical marker that is attached to the target object and reflects light;
a lighting device that irradiates the target object with light of a predetermined wavelength band;
an image acquisition device that acquires an image of the optical marker which has reflected the light of the predetermined wavelength band; and
an image processing device that processes the image acquired by the image acquisition device and thereby estimates the attitude of the target object,
wherein the lighting device and the image acquisition device are loaded on an aerospace vehicle,
wherein the light of the predetermined wavelength band is absorbed by a heat insulation film which forms a surface of the target object.

2. The navigation system according to claim 1, wherein the image processing device is loaded on the aerospace vehicle.

3. The navigation system according to claim 1, wherein the image processing device is allocated on a ground station.

4. The navigation system according to claim 1, wherein the lighting device includes a light emitting diode.

5. The navigation system according to claim 1, wherein the optical marker includes a retroreflective material.

6. The navigation system according to claim 1, wherein multiple optical markers are attached to a predetermined surface of the target object and are positioned rotationally asymmetrically with respect to a virtual axis which is vertical to the surface.

7. The navigation system according to claim 1, wherein the image acquisition device includes an optical lens and an imaging sensor, and
wherein the optical lens is provided with an optical filter which transmits the light of the predetermined wavelength band.

8. An aerospace vehicle comprising:
a lighting device that irradiates an optical marker which is attached to a target object in space and reflects light with light of a predetermined wavelength band; and
an image acquisition device that acquires an image of the optical marker which has reflected the light of the predetermined wavelength band,
wherein the image which has been acquired by the image acquisition device is processed and whereby an attitude of the target object can be estimated, and
wherein the light of the predetermined wavelength band is absorbed by a heat insulation film which forms a surface of the target object.

9. An optical marker which is attached to a target object in space before the target object is launched into space,
wherein: the optical marker reflects light of a predetermined wavelength band which has been radiated from a lighting device of an aerospace vehicle; an image of the optical marker which has reflected the light of the predetermined wavelength band is acquired by an image acquisition device of the aerospace vehicle; and the image is processed by an image processing device and whereby an attitude of the target object can be estimated, and
wherein the light of the predetermined wavelength band is absorbed by a heat insulation film which forms a surface of the target object.

* * * * *